D. S. BALLANCE.
COMBINED COTTON CHOPPER AND CULTIVATOR.
APPLICATION FILED DEC. 30, 1913.
1,122,356.
Patented Dec. 29, 1914.
2 SHEETS—SHEET 1.
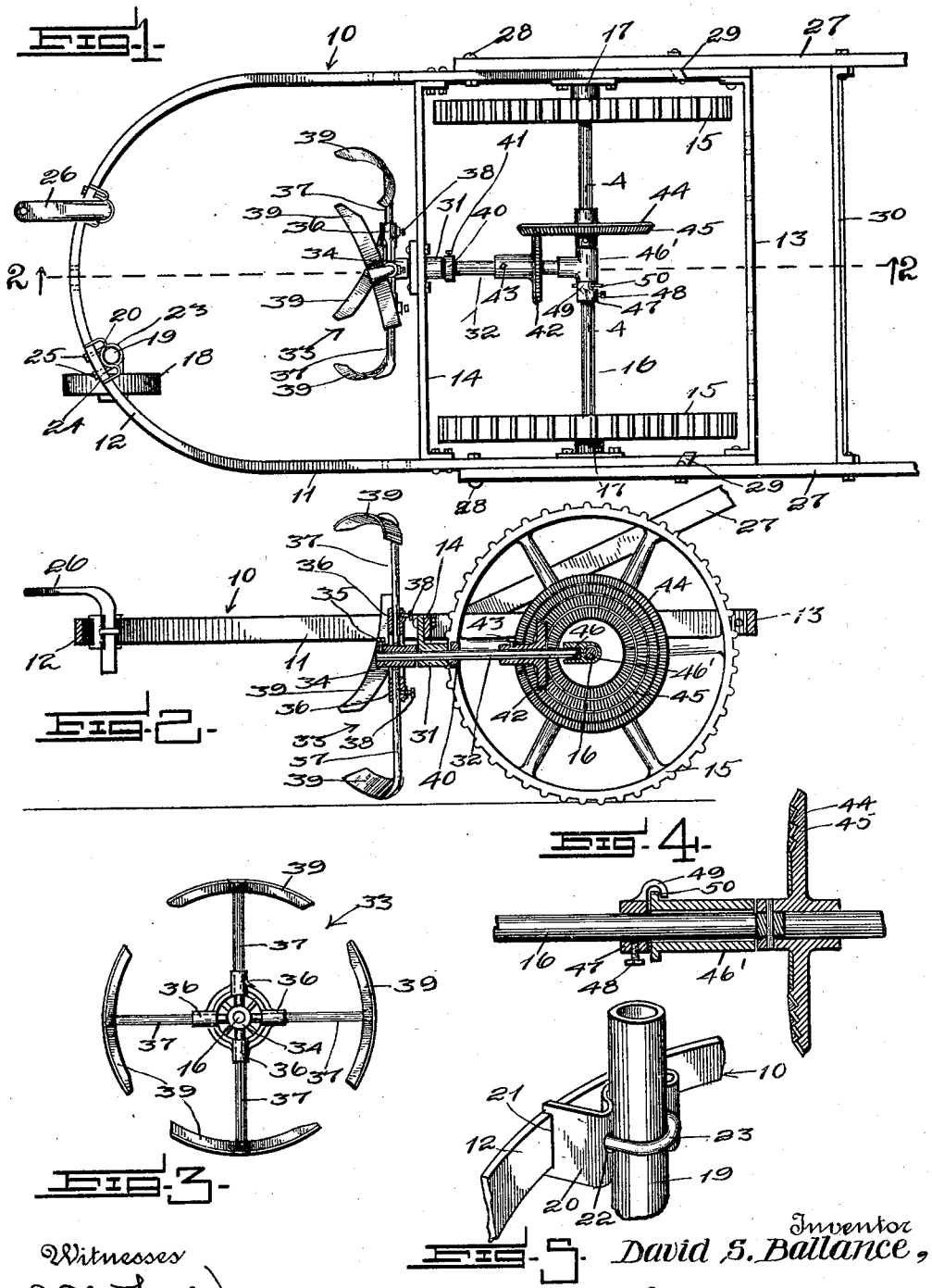
Witnesses
Inventor
David S. Ballance,
By C. L. Parker
Attorneys D. S. BALLANCE.
COMBINED COTTON CHOPPER AND CULTIVATOR.
APPLICATION FILED DEC. 30, 1913.
1,122,356.
Patented Dec. 29, 1914.
2 SHEETS—SHEET 2.
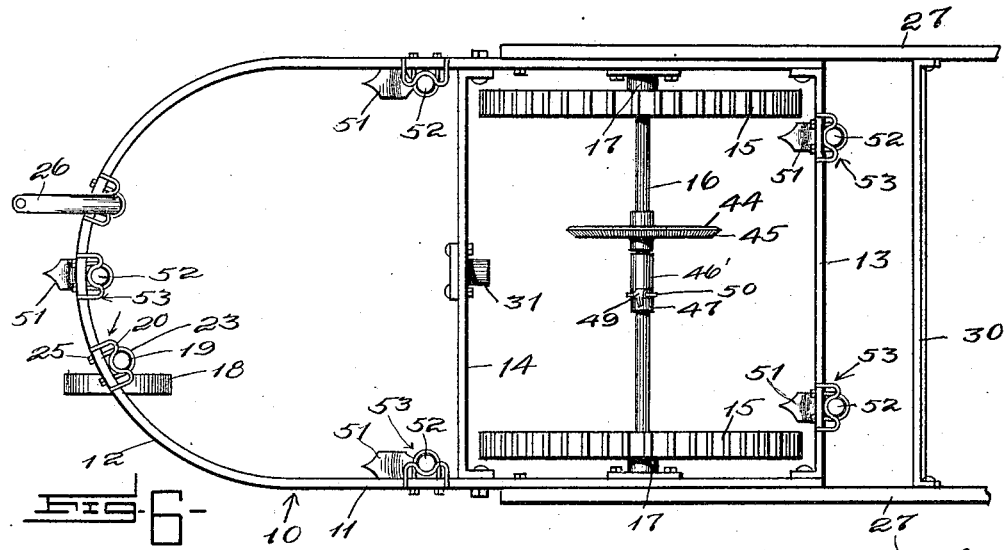
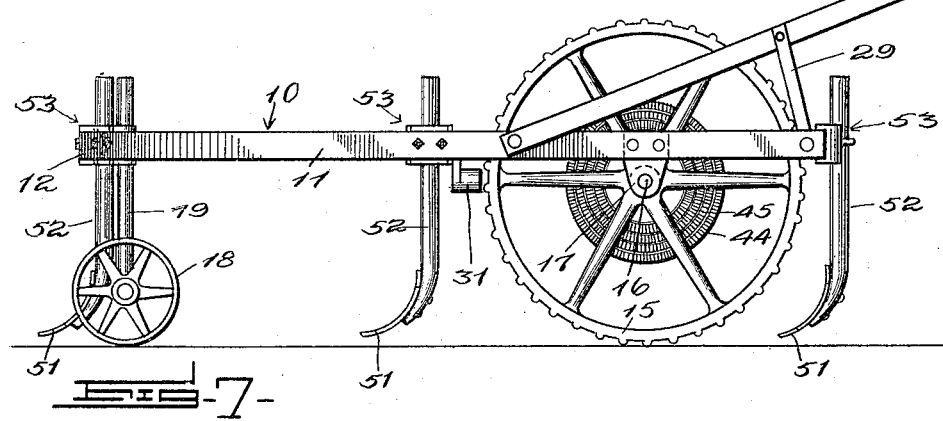
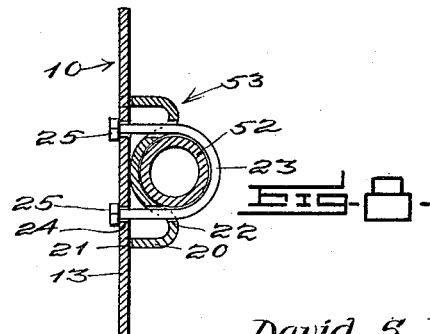
Witnesses
Inventor
David S. Ballance,
By
C. L. Parker
Attorneys

UNITED STATES PATENT OFFICE.

DAVID S. BALLANCE, OF WYSOCKING, NORTH CAROLINA, ASSIGNOR TO AMERICAN COTTON CHOPPER COMPANY, OF BALTIMORE, MARYLAND, A CORPORATION OF DELAWARE.

COMBINED COTTON CHOPPER AND CULTIVATOR.

1,122,356.      Specification of Letters Patent.      Patented Dec. 29, 1914.

Application filed December 30, 1913. Serial No. 809,541.

*To all whom it may concern:*

Be it known that I, DAVID S. BALLANCE, a citizen of the United States, residing at Wysocking, in the county of Hyde and State of North Carolina, have invented certain new and useful Improvements in Combined Cotton Choppers and Cultivators, of which the following is a specification.

My invention relates to a combined cotton chopper and cultivator which is readily convertible into a cotton chopper or cultivator, to be used as such.

An important object of the invention is to provide a machine of the above mentioned character, which is simple in construction, comparatively cheap to manufacture, and convenient in use.

A further object of the invention is to provide novel and simple means whereby the rotatable chopper may be readily removed from and placed upon the frame of the machine.

A further object of the invention is to provide novel and simple means to regulate the relative speed of rotation of the chopper.

A further object of the invention is to improve in general the construction of machines of this character, rendering them more reliable and efficient in operation.

Other objects and advantages of this invention will be apparent during the course of the following description.

In the accompanying drawings forming a part of this specification and in which like numerals are employed to designate parts throughout the same, Figure 1 is a plan view of a machine embodying my invention, showing the same in use as a cotton chopper, Fig. 2 is a longitudinal sectional view taken on line 2—2 of Fig. 1, Fig. 3 is a face view of the rotatable cutting element or chopper, Fig. 4 is a sectional view taken on line 4—4 of Fig. 1, Fig. 5 is a detail perspective view of clamping means embodied in my invention, Fig. 6 is a plan view of the machine showing the same in use as a cultivator, Fig. 7 is a side elevation thereof, and, Fig. 8 is a detail horizontal section through the clamping means embodied in the invention.

In the drawings, wherein for the purpose of illustration is shown a preferred embodiment of my invention, the numeral 10 designates a main frame as a whole, preferably formed of a bar 11, which is bent upon itself for providing a curved forward portion 12 of the frame. The rear ends of the bar 11 are connected by a transverse bar or piece 13. The side portions of the bar 11 are connected by a forward transverse bar or piece 14, as shown. The main frame is supported by traction wheels 15, preferably arranged between the transverse bars 13 and 14 and rigidly mounted upon an axle or shaft 16. This axle or shaft is rotatably mounted or journaled within depending bearings 17, which are rigidly connected with the sides of the bar 11, as more clearly shown in Fig. 7.

The forward end of the main frame 10 is supported by a wheel 18, more clearly shown in Figs. 1, 6 and 7. This wheel 18 is rotatably mounted upon the lower end of a preferably tubular vertical shaft 19, extending upwardly for adjustable connection with the forward curved portion 12 of the bar 11. The connecting means are shown more clearly in Figs. 5 and 8, wherein the numeral 20 designates a suitably resilient W-shaped element, having its free end provided with transverse recesses 21, to receive the portion 12 of the bar 11. The W-shaped resilient element 20 is provided with a pocket for receiving the tubular shaft 19, as shown. Adjacent the ends of this pocket are openings or apertures 22 receiving a staple or U-shaped element 23, serving to retain the tubular shaft 19 within the pocket of the W-shaped resilient element 20. The ends of the staple of U-shaped element 23 pass through openings 24 in the portion 12 of the bar 11, and are provided outwardly of the portion 12 with screw-threaded ends, carrying clamping nuts 25, as more clearly shown in Fig. 8. It is thus seen that by turning the clamping nuts 25 the staple or U-shaped element 23 will securely retain the tubular shaft 19 within the pocket of the W-shaped resilient element 20, which element 20 owing to its resiliency, will in turn exert yielding pressure upon the staple 23, preventing the nuts 25 from unscrewing. It is also obvious that this W-shaped element 20 strengthens the union between the post and the portion 12, preventing said post or shaft from moving laterally with relation thereto.

Connected with the curved portion 12 is draft attaching means 26, which are preferably secured thereto by apparatus which is identical with that embodying the W-shaped resilient element 20 hereinabove described.

Connected with the sides of the bar 11 rearwardly of and near the transverse element or bar 14 are rearwardly extending handles 27, as shown at 28. These handles have connection with vertical adjustable supports 29, as more clearly shown in Fig. 7. The free ends of the handles 27 are preferably connected by a transverse rod 30, as shown.

Rigidly connected with the forward transverse bar 14 is a depending bracket or bearing 31, rotatably receiving a longitudinally extending shaft 32. This shaft carries at its forward end a rotatable cutting element or chopper 33. This chopper comprises a hub 34, which is clamped to the shaft 32 by a clamping bolt 35. The hub 34 carries radially extending tubular sockets 36, receiving arms or spokes 37, the same being adapted to be turned therein upon their longitudinal axes, and clamped or locked in desired positions by clamping bolts 38. These arms or spokes carry at their outer ends cutters or blades 39, preferably of the shape shown. The shaft 32 is capable of moving longitudinally within the opening of the bearing 31, such movement in a rearward direction being prevented by the hub 34, and in an opposite direction by a stop-ring 40, which is loosely mounted upon the shaft and is locked thereto by means of a clamping bolt 41.

The numeral 42 designates a bevel gear, loosely mounted upon the shaft 32, and locked thereto by a bolt 43, as shown.

Rigidly mounted upon the axle 16 is a gear 44, arranged in coöperative relation to the bevel gear 42, and provided upon its inner face with a plurality of annular sets of bevel gear teeth 45, arranged concentrically, as shown. It is obvious that the speed of rotation of the bevel gear 42 and consequently that of the chopper or cutter will be varied by having the bevel gear 42 engage a selected one of the annular set of bevel gear teeth 45.

The rear end of the longitudinal shaft 32 is journaled within the opening 46, of a T-shaped bracket or bearing 46', which is loosely mounted upon the axle 16, the same being prevented from moving longitudinally thereon in one direction by engagement with the hub of the gear 44. This bearing 46' is normally prevented from moving longitudinally upon the axle 16 in an opposite direction by means of a stop-ring or sleeve 47 which is loosely mounted upon the axle 16 and normally locked thereto by means of a clamping bolt 48, as more clearly shown in Fig. 4. In order that the stop-ring 47 and the bearing 46' may have a swiveled connection, so that they may be moved together longitudinally in either direction, or so that the bearing may be moved longitudinally by the movement of the ring 47, I provide said ring with an overhanging curved portion or hook 49, receiving therein an annular flange 50 formed upon the outer end of the bearing 46'. When it is desired to move the bevel gear 42 from engagement with one set of annular bevel gear teeth 45 and into engagement with another set of such bevel gear teeth, the clamping bolt 48 is unscrewed, whereby the ring 47 may be moved longitudinally outwardly, effecting a corresponding movement of the T-shaped bearing 46', whereby the bevel gear 42 will disengage the bevel gear of the gear 44. It is thus seen that the shaft 32 is moved perceptibly laterally, which is permissible by having the opening of the bearing 31 made sufficiently large. The clamping bolt 43 is now unscrewed, whereby the bevel gear 42 may be shifted longitudinally of the shaft 32 in either direction, so that it will engage with the desired angular set of bevel gear teeth 45, when bearing 46' is returned to its normal position and locked against longitudinal movement by the ring 47, as is obvious.

When the machine is to be used as a cultivator, it is desirable that the rotatable cutter or chopper be removed, as shown in Figs. 6 and 7. To accomplish this the clamping bolts 41 and 42 are suitably unscrewed, whereby the shaft 32 will be free to be moved longitudinally through and out of the bearing 31, the same being at the same time separated from the ring 40 and bevel gear 42. These parts, of course, are to be stored away and may be just as readily returned to their operative positions, when the machine is to be used as a chopper. As clearly shown in Figs. 6 and 7, the main frame 10 is provided with a suitable number of cultivator plow shares 51, attached to the ends of preferably tubular standards 52. These standards are connected with the bar 11 of the main frame 10 by attaching apparatus 53, which is identical with that embodying the W-shaped resilient element 20, hereinabove described. I prefer to arrange the cultivator plow shares 51, as more clearly shown in Fig. 6, that is I have found it advantageous to connect two of these plow shares with the rear transverse bar 13, two of them with the rear end of the curved portion 12 of the bar 11, and one with the forward end of the curved portion 12. It is to be understood however that the arrangement and number of these plow shares may be varied as may be found advantageous under the particular circumstances. It is obvious that the standards 52 may be used for connecting other implements with the main frame, such as a dirter or the like.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having described my invention, I claim:—

In a machine of the character described, a main frame, an axle connected therewith, traction wheels carried by the axle, a gear mounted upon the axle for rotation therewith and provided with a plurality of sets of concentric annular teeth, a transverse bar arranged forwardly of the axle and connected with the main frame, a bearing attached to the transverse bar, a T-shaped bearing having one arm thereof pivotally mounted upon the axle and adapted to be arranged in horizontal alinement with the first named bearing, the said arm of the bearing having one end thereof engaging the gear and its opposite end provided with an outwardly extending annular flange, a ring mounted upon the axle adjacent the flanged end of the arm and carrying a hooked finger to overhang and engage the annular flange, means to lock the ring to the axle in adjustment at a desired position, a horizontal longitudinal shaft removably mounted in the first named bearing and having its forward end removably mounted in the other arm of the T-shaped bearing, adjustable clamping means carried by the longitudinal shaft and adapted to engage with the first named bearing to prevent the longitudinal movement of said shaft in one direction, a bevel gear longitudinally adjustably mounted upon the longitudinal shaft and adapted to be moved into engagement with a selected annular set of gear teeth, means to lock the bevel gear to the longitudinal shaft in adjustment at the desired longitudinal position, and a vertically rotating cutter secured to the free end of the horizontal longitudinal shaft.

In testimony whereof I affix my signature in presence of two witnesses.

DAVID S. (×) BALLANCE.
his mark

Witnesses:
G. A. LILLY, Jr.,
T. D. NIEDYETE.

Copies of this patent may be obtained for five cents each, by addressing the "Commissioner of Patents, Washington, D. C."